United States Patent [19]

Willey

[11] 3,842,479
[45] Oct. 22, 1974

[54] COLLAR ASSEMBLY FOR USE WITH A RIVET AND METHOD OF ASSEMBLING A JOINT

[75] Inventor: Glenn R. Willey, Santa Ana, Calif.

[73] Assignee: Standard Pressed Steel Co., Jenkintown, Pa.

[22] Filed: Feb. 8, 1973

[21] Appl. No.: 330,529

Related U.S. Application Data

[62] Division of Ser. No. 883,755, Dec. 10, 1969, Pat. No. 3,733,958.

[52] U.S. Cl.................. 29/423, 29/509, 29/522, 52/758 F
[51] Int. Cl............................................ B23p 17/00
[58] Field of Search...... 29/509, 423, 509 R, 522 R, 29/522, 526; 85/37, 1 JP; 52/758 F; 285/2

[56] References Cited
UNITED STATES PATENTS

| | | | |
|---|---|---|---|
| 1,862,895 | 6/1932 | Jackson | 52/758 F UX |
| 2,756,795 | 7/1956 | Clingman | 85/1 JP UX |
| 3,426,641 | 2/1969 | Rosman | 85/37 |
| 3,551,015 | 12/1970 | Whiteside et al. | 85/37 X |
| 3,561,102 | 2/1971 | Diemer | 29/522 X |

Primary Examiner—Charlie T. Moon

[57] ABSTRACT

A breakable collar for use with a rivet and an associated metal collar comprises an annular body portion having a recess in one end face. The metal collar is carried in the recess and the resultant assembly is frictionally retained on the tail of the rivet with the metal collar bearing against the outer surface of an adjacent panel in which the rivet is seated. When an axial force is applied to the rivet, the breakable collar splits or collapses so as not to interfere with the formation of the upset tail.

5 Claims, 12 Drawing Figures

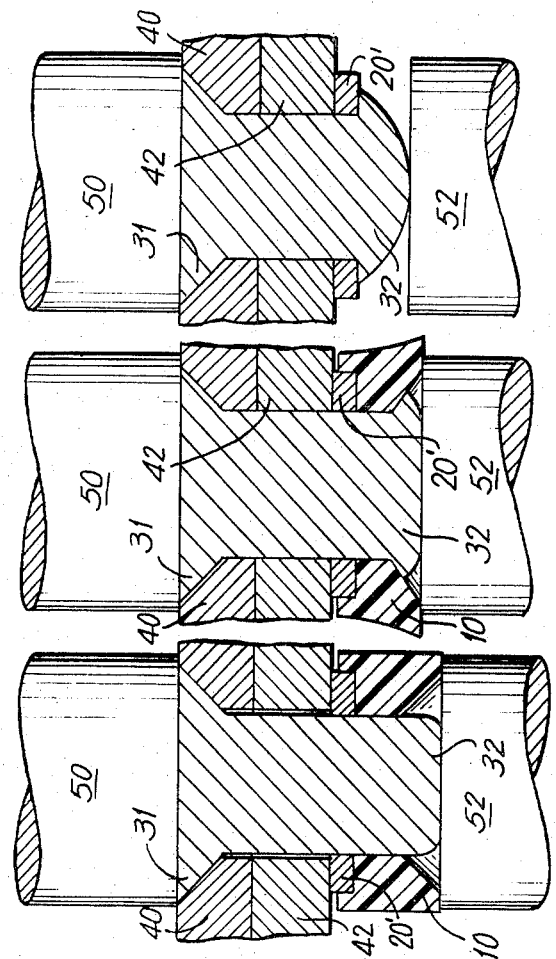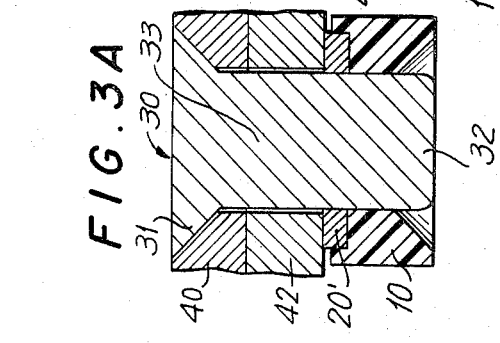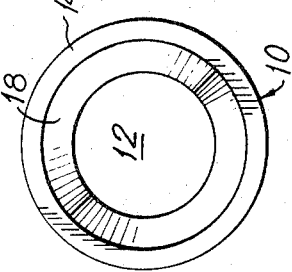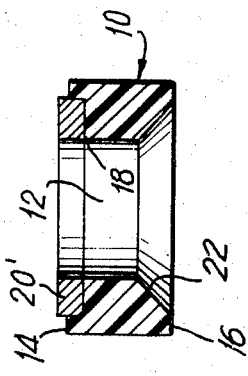

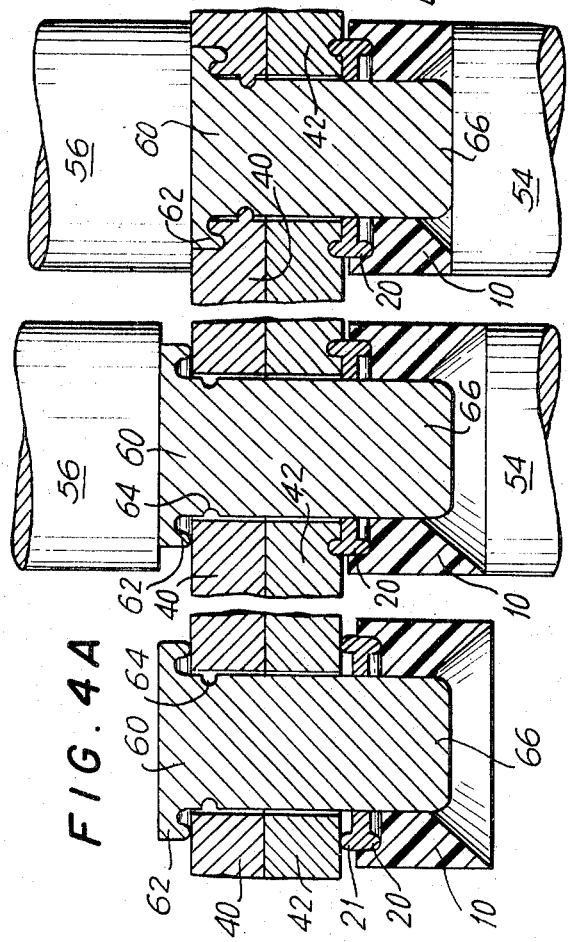

COLLAR ASSEMBLY FOR USE WITH A RIVET AND METHOD OF ASSEMBLING A JOINT

This is a division of application Ser. No. 883,755, filed Dec. 10, 1969, now Pat. No. 3,733,958.

This invention relates to an assembly for and a method of fastening structural members together with a rivet and an associated metal collar.

The usual method of assembling joints with a rivet and metal collar includes inserting the shank of the rivet into aligned apertures in a stack of structural members with a tail portion of the shank projecting beyond the stack, passing the metal collar over the projecting tail portion, and applying a tool that provides an axial force against the rivet to form the upset tail. When the axial force is first applied to the rivet, an initial radial expansion occurs in the shank before the upset starts to form. Thus, if the metal collar is not engaged with the adjacent structural member of the stack prior to the application of the axial force, clamp-up of the joint cannot be achieved because the radial expansion of the shank prevents the metal collar from moving into engagement with the adjacent structural member.

In certain orientations of the rivet and metal collar, the metal collar is free to slide off the rivet and this necessitates the use of special tools with collar engaging portions to hold the collar against the adjacent structural member during the application of the axial force that forms the upset tail. In those orientations of the rivet and metal collar where gravity restrains the metal collar against falling off the rivet, special tools are still required to hold the collar against the adjacent structural member due to the bouncing of the collar caused by the vibration of the tool. Such tools are relatively expensive and, therefore, add to the assembly cost of the joint.

As pointed out above, in certain orientations of the rivet and metal collar, gravity holds the metal collar in engagement with the adjacent structural member. In these orientations, however, the rivet will fall out of the stack unless supported. In the other orientations of the rivet and metal collar, unless supported the metal collar will fall off the tail of the rivet. Accordingly, in these orientations, either the rivet of the metal collar must be supported by hand until the installation tools are applied, and the method of assembling the joint is awkward, timeconsuming and expensive.

It is an object of this invention, therefore, to provide an assembly for and a method retaining a rivet and a metal collar engaged with a stack of structural members prior to assembly of a joint.

It is another object of this invention to provide a retaining assembly for and a method of assembling a joint with a rivet and metal collar without the need for special tools.

It is still another object of this invention to provide a retaining assembly for and method of assembling a joint with a rivet and metal collar without interfering with the formation of the upset tail on the rivet.

These and other objects of this invention are accomplished by providing a readily breakable collar formed with a recess at one end face in which the metal collar of a rivet-collar combination is received. The rivet is inserted in aligned apertures in a stack of structural members to be joined and the breakable metal collar assembly is placed on the projecting tail of the rivet and is frictionally retained thereon with the metal collar engaging the outer surface of the adjacent structural member and the breakable collar extending at least as far as a plane containing the end of the tail. As the shank of the rivet is upset by a conventional tool, the breakable collar splits and is forced away from the upset so as not to interfere with the formation thereof. Depending upon the material from which the breakable collar is made, it either breaks completely and due to the upset force, flies away from the rivet or deforms to an extent not to interfere with the formation of the upset.

For a better understanding of the present invention, together with the objects thereof, reference is made to the following description, taken in conjunction with the accompanying drawing, and its scope will be pointed out in the appended claims.

Referring to the drawing;

FIG. 1 is a plan view of a breakable collar in accordance with the present invention;

FIG. 2a is a sectional view taken along the line 2—2 of FIG. 1 showing a breakable collar in accordance with this invention with one type of metal collar retained therein;

FIG. 2b is a sectional view taken along the line 2—2 of FIG. 1 showing a breakable collar in accordance with this invention with another type of metal collar retained therein;

FIGS. 3a, 3b, 3c, and 3d illustrate the sequence in which one type of rivet and collar combination utilizing a breakable collar in accordance with the present invention is installed; and FIGS. 4a, 4b, 4c, 4d and 4e illustrate the sequence in which another type of rivet and collar combination utilizing a breakable collar in accordance with the present invention is installed.

Referring to FIGS. 1 and 2, a breakable collar in accordance with this invention is shown as comprising a plastic, cylindrical body member 10 having end faces 14 and 16. While the body member is shown as plastic, it is to be understood that other materials possessing a readily breakable characteristic can be utilized. Since plastic is relatively inexpensive, however, its use is preferred.

An aperture 12 is provided in the body member and extends from end face 14 through to end face 16 with a predetermined diameter to frictionally grip the shank of a rivet with which it will be used. Extending inwardly from end face 14 is a counterbore 18 that forms a shoulder 19 extending between aperture 12 and the counterbore.

Counterbore 18 has a predetermined diameter to frictionally retain a metal collar that is to be used with a rivet in clamping a joint. One type of collar 20, shown in FIG. 2a, includes a coining ring 21 to induce a residual compressive stress in the joint. Another type of collar, as shown in FIG. 2b, is the conventional washer type 20'.

During assembly of a joint in which the breakable collar is used, an axial force is applied to the rivet to upset the trail. When this force is applied, the breakable collar will break and either fall away from the rivet or have small portions thereof retained between the upset tail and the metal collar. In order to facilitate the breaking of the plastic collar, it can be formed with a weakened portion 22. In this embodiment, weakened portion 22 is shown as a conical surface having its larger diameter at end face 16.

Plastic collar 10 may be economically injection molded and the metal collar may be inserted in the aperture 18 and frictionally retained therein. Alternatively, the metal collar 20 may be incorporated in an injection mold and the entire collar assembly molded in a single operation.

Referring to FIGS. 3a, 3b, 3c and 3d, a method of assembling one type of rivet and collar combination in accordance with this invention is illustrated. A pair of panel members 40 and 42 having aligned apertures are placed in face to face relationship to form an opening therethrough. A rivet 30 having a head 31 and a shank 33 is inserted in the opening so that a tail 32 projects beyond the outer surface of panel member 42. It will be noted that panel member 40 is formed with a countersink around the aperture so that, when inserted, the rivet lies flush therewith. As best seen in FIG. 3a, a collar assembly including breakable collar 10 and metal collar 20' is inserted on the tail of the rivet and is frictionally retained thereon with end face 16 lying in a plane containing the end of the tail and the metal collar bearing against panel member 42. Of course, the breakable collar could project beyond the end of the tail. A suitable driving tool 50 of the type that applies a reciprocating force is placed adjacent head 31, as best seen in FIG. 3b, and an anvil or support member 52 is brought into engagement with the end of the tail and end face 16 of the breakable collar. When actuated, the tool applies a force axially of the rivet in a repeated reciprocating movement and creates a reaction force at the interface of the anvil and the end of the tail. As best seen in FIG. 3c, the reaction force causes radial expansion of shank 33 providing an interference fit with the holes in the panels and an interference fit between tail 32 and the metal collar; thereafter the reaction force starts to upset the tail and deform the breakable collar. The interference fit between the tail and the metal collar retains the metal collar against panel 42. As the force continues, the plastic collar eventually breaks and is forced away from the rivet until complete upset of the tail is achieved as best seen in FIG. 3d. It should be apparent, that the plastic collar need not break completely, but that small portions can remain trapped between the upset tail and the bottom surface of collar 20.

Referring now to FIGS. 4a, 4b, 4c, 4d and 4e, there is illustrated the use of a collar assembly according to this invention with a rivet 60 having a coining ring 62 formed on the head and a groove 64 formed on the shank adjacent the head. In addition, metal collar 20 is of the type shown in FIG. 2a and includes a coining ring 21 projecting above end face 14 of the breakable collar. This particular rivet and collar combination provides excellent fatigue strength characteristics in the joint.

At this point, it should be noted that there are two methods of assembling this type of fastener, the "one-shot" method or the "two-shot" method. The one-shot method will be described first. As shown in FIG. 4a, rivet 60 is placed through aligned apertures in panels 40 and 42 so that a tail 66 projects beyond panel 42 and a collar assembly including breakable collar 10 and metal collar 20 is placed and frictionally retained on the tail of the rivet. It should be noted that end face 16 of collar 10 extends beyond the end of the tail when coining bead 21 bears against panel 42. Referring to FIG. 4b, a suitable anvil 54 is brought into engagement with end face 16 of breakable collar 10 and a conventional reciprocating tool 56 is brought to bear against head 60 of the rivet. When tool 56 is actuated, a reciprocating reaction force is created at the collar-anvil interface that embeds coining ring 21 into panel 42 while the force of the tool embeds coining ring 62 and head 60 in panel 40. In addition to preventing the metal collar from moving, it should be noted that use of the breakable collar supports panel member 42 and thereby allows head 60 to embed in panel 40. As the head is embedded, tail 66 moves axially into engagement with anvil 54, the shank of the rivet expands radially and the tail starts to upset, thereby deforming collar 10 as best seen in FIG. 4d. As the axial movement and upset of the tail continue, collar 10 breaks and is forced away from the rivet. Again, the collar need not break completely and small portions can remain trapped between the upset tail and the collar. As best seen in FIG. 4e, continued axial movement of the rivet causes a complete upset of tail 66 and clamp-up of the joint.

In the "two-shot" method, the rivet is inserted into aligned apertures in a stack of panel members and the head is immediately embedded in the adjacent panel. At this point, a collar assembly is placed on the tail of the rivet and the remainder of the method proceeds from the position illustrated in FIG. 4c, i.e., tool 56 is actuated and a reaction force starts to upset the tail, deform and break the breakable collar, and clamp the joint as shown in FIGS. 4d and 4e.

It should be apparent from the preceding description that use of a breakable collar in accordance with this invention retains the rivet and collar in engagement with the structural members of the joint prior to upset of the rivet tail. In addition, the metal collar is retained in engagement with the adjacent structural member of the joint during the upset of the tail and clamp-up of the joint is achieved without special tools.

While there has been described a preferred embodiment of this invention, it will be obvious to those skilled in the art that various changes and modifications may be made therein without departing from the scope of the invention. Accordingly, all such changes and modifications that fall within the scope of the invention are intended to be covered.

What is claimed is:

1. A method of forming a joint comprising:
   a. providing a stack of structural members having aligned apertures therein;
   b. inserting a rivet in said apertures so that a shank portion of the rivet projects beyond the outer surface of an outermost one of said structural members;
   c. providing a collar assembly comprising a breakable collar retaining a metal collar and placing the collar assembly on the projecting shank portion of said rivet;
   d. applying a force axially of the rivet to upset the projecting shank portion of said rivet and break said breakable collar.

2. A method according to claim 1 further comprising coining the metal collar into engagement with said outer surface of said outermost one of said structural members.

3. A method according to claim 1 further comprising embedding the head of said rivet into the outer surface of the other outermost one of said structural members.

4. A method according to claim 3 wherein said collar assembly is placed on said projecting shank portion of said rivet so that the end face of said breakable collar projects at least to a plane containing the end of said shank portion.

5. A method of forming a joint comprising:
a. providing a stack of structural members having aligned apertures therein;
b. inserting a rivet in said apertures so that a shank portion of the rivet projects beyond the outer surface of an outermost one of said structural members;
c. placing a breakable collar on the projecting shank portion of said rivet, said breakable collar retaining a metal collar in engagement with said outer surface of said outermost of said structural members;
d. applying a force axially of the rivet to upset the projecting shank portion of said rivet and break said breakable collar.

* * * * *